3,179,640
HYDROXYFLUOROALKYL-SUBSTITUTED STYRENES, THEIR POLYMERS AND THEIR PREPARATION
William J. Middleton, Wilmington, Del., assignor to E. I. du Pont de Nemours and Company, Wilmington, Del., a corporation of Delaware
No Drawing. Filed Sept. 28, 1962, Ser. No. 227,068
22 Claims. (Cl. 260—85.5)

This invention relates to, and has as its principal objects provision of, novel and useful monomeric fluorine-substituted styrenes, polymers of the novel styrenes, and the preparation of both monomers and polymers.

In accordance with the present invention, a new class of styrenes has been made which contain a hydroxydi-(fluoroalkyl)methyl substituent and which yield polymers having unusual swelling properties by virtue of the strong hydrogen bonding characteristics of the hydroxydi(fluoroalkyl)methyl substituents. More specifically, this invention provides (A) styrenes containing on the benzene ring a hydroxy[di(polyfluoroalkyl)]methyl substituent, said styrene having the formula

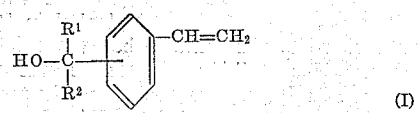

(I)

wherein $R^1$ and $R^2$ are, individually, the same or different monovalent polyfluoroalkyl, including perfluoroalkyl, ω-hydroperfluoroalkyl and ω-chloroperfluoroalkyl, radicals, or jointly, a divalent perfluoroalkylene radical; (B) polymers of such compounds; and (C) the preparation of the new monomers by pyrolysis of hydroxydi(polyfluoroalkyl)methyl-substituted ethyl benzenes (X being hydrogen in Formula (II)) or certain α-substituted ethylbenzenes (X being other than hydrogen) of the formula

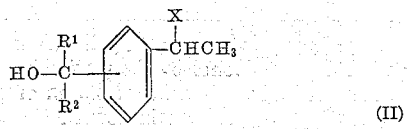

(II)

wherein $R^1$ and $R^2$ are as previously defined and X is hydrogen, halogen (chlorine or bromine) or a hydrocarbonoyloxy group

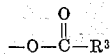

$R^3$ being hydrocarbon of up to 18 carbons free from aliphatic or nonaromatic unsaturation, preferably alkyl. Preferably, monovalent $R^1$ and $R^2$ have up to 8 carbons each and divalent conjoined $R^1$ and $R^2$ total from 3 to 5 carbons. In the formulas, the indicated uncertainty in the position of the hydroxyl-bearing radical means that the radical can be in either the para or meta position. The position in the product is determined by the position in the starting material.

The new styrenes of Formula I are liquid or solid materials of relatively low volatility that can be distilled without decomposition. They undergo vinyl polymerization readily, e.g., spontaneously in, for example, from one hour to one week, with the aid of an added free radical initiator, or under the influence of activating radiation such as ultraviolet light. The hydroxydi(polyfluoroalkyl)methyl substituent on the benzene ring is resistant to thermal decomposition, oxidation or acidic reagents, and forms salts with basic reagents, e.g., alkali metal or ammonium hydroxides. Aqueous solutions of the monomer salts can be used to prepare aqueous solutions of polymers with water-soluble free radical initiators such as sodium persulfate or a redox system.

The pyrolytic process for synthesizing the new styrenes can be represented by the equation:

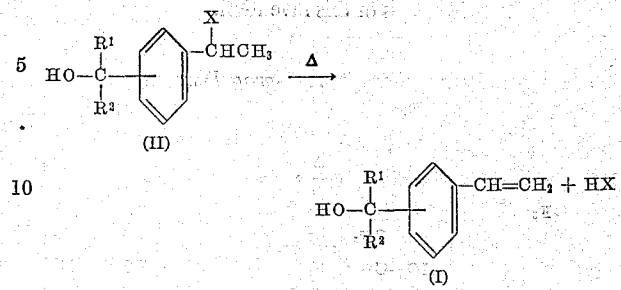

wherein $R^1$, $R^2$ and X are as above. When X is hydrogen, the product HX is molecular hydrogen; and the process is a pyrolytic dehydrogenation which can be effected at an appropriately high temperature (ca. 500° to over 800° C.) in the presence of an oxide catalyst such as chromia-alumina ($Cr_2O_3/Al_2O_3$) or Fe/Cu oxide. When X is halogen, HX is a hydrogen halide; and the process is a pyrolytic dehydrohalogenation which can be effected at a temperature in the range of about 200° to about 800° C., suitably in a continuous vapor phase flow procedure. When X is a hydrocarbonoyloxy group, HX is a hydrocarboncarboxylic acid; and the process is a pyrolytic deacylation which can be effected by heating the carboxylic ester at its boiling point or higher, i.e., in the range of about 200° to about 800° C., suitably in a distillation procedure or in a continuous vapor phase flow operation.

The pyrolysis products are recovered by condensation of the vapors. The desired hydroxydi(fluoroalkyl)methylstyrene is separated and purified by conventional methods, especially by distillation.

The hydroxydi(fluoroalkyl)methyl - substituted ethylbenzenes that are pyrolyzed to the corresponding styrenes are obtainable by processes described in U.S. Pat. No. 3,148,220 and in the copending, coassigned application of D. C. England, Ser. No. 107,296, filed May 3, 1961. Thus, for example, para-[hydroxydi(fluoroalkyl)methyl]-ethylbenzenes are obtained from ethylbenzene and di-(fluoroalkyl)ketones with Friedel-Crafts catalysts. Corresponding meta-substituted ethylbenzenes are obtained from m-ethylphenylmetallic reagents, e.g., m-ethylphenyl-magnesium bromide, and the di(fluoroalkyl)ketones. All of these ethylbenzenes are readily halogenated (with chlorine or bromine) to the corresponding α-haloethylbenzenes, and the latter are convertible to α-hydrocarbonoyloxyethylbenzenes by reaction with salts, e.g., silver salts, of hydrocarboncarboxylic acids.

Polymers of the present novel hydroxydi(polyfluoroalkyl)methylstyrenes can be readily obtained by conventional methods of vinyl polymerization as shown schematically by the equation:

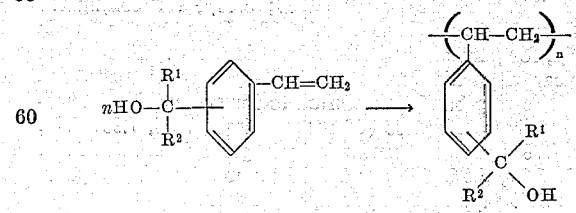

The polymers range from flexible film-forming products readily soluble in ordinary solvents, such as acetone, to hard glass-like products insoluble in the usual solvents. The polymers are uniquely characterized by the hydroxydi(polyfluoroalkyl)methyl substituents on the benzene rings. These substituents confer exceptional solvent-receptive properties to the polymer, such that insoluble polymers are highly swollen by and retentive of a wide variety of solvents. Extremely insoluble polymers, especially copolymers, are swollen by strong solvents such as dimethylformamide while being resistant to swelling by weaker solvents such as lower alkanols.

The following nonlimiting examples further illustrate the products and process of this invention.

EXAMPLE I

*p-(2-hydroxyhexafluoro-2-propyl)styrene*

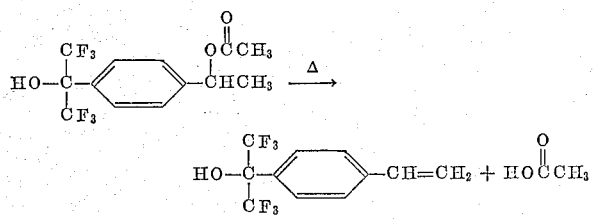

A. α,α - bis(trifluoromethyl) - 4 - (α' - acetoxyethyl)-benzyl alcohol was prepared in the following way:

A mixture of 20 g. (0.12 g. mole) of silver acetate and 35 g. (0.1 g. mole) of α,α-bis(trifluoromethyl)-4-(α'-bromoethyl)benzyl alcohol in 100 ml. of acetonitrile was stirred until the exothermic reaction subsided. The reaction mixture was then filtered, and the filtrate was distilled under reduced pressure. There was obtained 23.1 g. of viscous, liquid product, B.P. 141–142° C./2.5 mm., which solidified on cooling. The solid product was identified as α,α-bis(trifluoromethyl)-4-(α'-acetoxyethyl)benzyl alcohol, M.P. 75° C.

Anal. for $C_{13}H_{12}F_6O_3$:

|  | C | H | F |
|---|---|---|---|
| Calc'd | 47.28 | 3.67 | 34.52 |
| Found | 47.68 | 3.67 | 32.88 |

B. In a distillation flask connected to a fractionating column was placed 100 g. of α,α-bis(trifluoromethyl)-4-(α'-acetoxyethyl)benzyl alcohol. The alcohol was heated strongly at atmospheric pressure, and 16 g. of acetic acid, B.P. 100–120° C., was fractionally separated at a reflux ratio of about 2:1 at the still head. Continued distillation at atmospheric pressure yielded material, B.P. 120–240° C., which was redistilled under reduced pressure. There was obtained 42 g. of product which was identified as p-(2-hydroxyhexafluoro-2-propyl)styrene, B.P. 77–78° C./5 mm., $n_D^{25}$ 1.4520.

Anal. for $C_{11}H_8F_6O$:

|  | C | H | F |
|---|---|---|---|
| Calc'd | 48.90 | 2.99 | 42.19 |
| Found | 49.29 | 3.16 | 41.59 |

The product was characterized by its infrared spectrum, containing the following bands: 2.78 and 2.83μ, for OH; 3.23, 3.27 and 3.31μ, for =CH; 6.11μ, for conjugated olefinic C=C; 6.17, 6.37, and 6.58μ, for aromatic C=C; 11.9μ, for para-disubstituted aromatic group. The proton nuclear magnetic resonance (n-m-r) spectrum contains the following bands, all shifted to lower field from tetramethylsilane reference (60 megacycles): 7.24, 7.39, 7.64, and 7.78 p.p.m., for aromatic hydrogens; 5.10, 5.29, 5.51, 5.80, 6.37, 6.56, 6.67, and 6.86 p.p.m., for vinyl hydrogens; 3.55 p.p.m., for hydroxyl hydrogen.

C. A 10 g. quantity of α,α-bis(trifluoromethyl)-4-(α'-acetoxyethyl)benzyl alcohol was melted and added dropwise over a period of 30 minutes into a platinum tube, ½" in diameter, inclined at an angle of 30" and heated to 640° C. over a length of 12 inches. The effluent gases were condensed in an ice-cooled trap, and the condensate was distilled. A colorless liquid product, 7.2 g., B.P. 84–85° C./4.6 mm., was identified as p-(2-hydroxyhexafluoro-2-propyl)styrene by its proton n-m-r spectrum.

D. A bromine adduct of p-(2-hydroxyhexafluoro-2-propyl)styrene was prepared by treating a carbon tetrachloride solution of the styrene with bromine until a faint bromine color persisted. The precipitated product was collected on a filter and recrystallized from pentane, to yield colorless prisms of α,α-bis(trifluoromethyl)-4-(α',β'-dibromoethyl)benzyl alcohol, M.P. 57–58° C.

Anal. for $C_{11}H_8Br_2F_6O$:

|  | Br |
|---|---|
| Calc'd | 37.14 |
| Found | 37.44 |

EXAMPLE II

*p-(2-hydroxyhexafluoro-2-propyl)styrene*

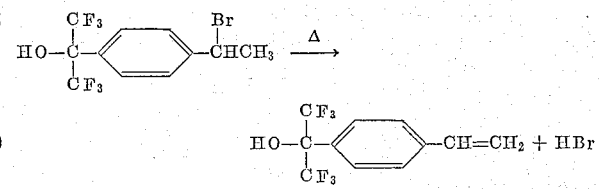

A. α,α - bis(trifluoromethyl) - 4 - (α' - bromoethyl)-benzyl alcohol was prepared in the following way:

A solution of 16 g. (0.1 g. mole) of bromine in 25 ml. of carbon tetrachloride was added dropwise to a stirred solution of 27.2 g. (0.1 g. mole) of α,α-bis(trifluoromethyl)-4-ethylbenzyl alcohol in 50 ml. of carbon tetrachloride, the mixture being irradiated with a sunlamp. The addition of bromine was accomplished in about 30 minutes, and at the end the temperature of the reaction mixture was 45° C. Distillation of the mixture under reduced pressure gave 28.55 g. of α,α-bis(trifluoromethyl)-4-(α'-bromoethyl)benzyl alcohol, a colorless oil, B.P. 88–89° C./0.8 mm., $n_D^{25}$ 1.4710.

Anal. for $C_{11}H_9BrF_6O$:

|  | Br | F |
|---|---|---|
| Calc'd | 22.73 | 32.47 |
| Found | 20.97 | 32.34 |

By Pyrolysis of α,α-bis(trifluoromethyl-4-(α'-bromoethyl)benzyl alcohol by the platinum tube process shown in Example I resulted in formation of p-(2-hydroxyhexafluoro-2-propyl)styrene in about 20% conversion.

EXAMPLE III

*p-(2-hydroxyhexafluoro-2-propyl)styrene*

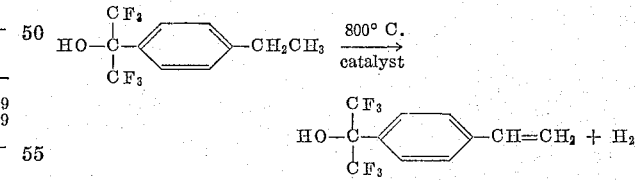

A. α,α - bis(trifluoromethyl) - 4 - ethylbenzyl alcohol was prepared in the following way:

A mixture of 332 g. (2.0 g. moles) of hexafluoroacetone, 318 g. (3.0 g. moles) of ethylbenzene and 10 g. of anhydrous aluminum chloride was heated at 100° C. in a 1 liter pressure vessel for 8 hours. The liquid product was distilled to give 464 g. of colorless distillate, which was identified as α,α-bis(trifluoromethyl)-4-ethylbenzyl alcohol, B.P. 71–72° C./6.5 mm., $n_D^{25}$ 1.4261.

Anal. for $C_{11}H_{10}F_6O$:

|  | C | H | F |
|---|---|---|---|
| Calc'd | 48.54 | 3.71 | 41.88 |
| Found | 48.98 | 3.87 | 41.54 |

B. α,α-bis(trifluoromethyl)-4-ethylbenzyl alcohol was catalytically dehydrogenated by passing it, mixed with steam, through a bed of K-promoted Fe/Cu oxide on MgO (Esso 1707 catalyst) heated to 800° C. The conversion to p-(2-hydroxyhexafluoro-2-propyl)styrene was about 5%, as indicated by infrared examination for the pyrolysate.

EXAMPLE IV

*Spontaneous polymerization of p-(2-hydroxyhexafluoro-2-propyl)styrene*

Samples of the styrene prepared from the acetate precursor, as in Example I, were found to polymerize spontaneously at room temperature. Polymers obtained in this fashion from different samples of monomer sometimes possessed markedly variable properties. Thus, one sample of polymer was a colorless, hard glass-like material which, though insoluble in acetone, was greatly swollen by this solvent with formation of a clear gel. Another sample was an acetone-soluble solid which could be melt-pressed at 190° C. to form a stiff, clear, self-supporting film.

EXAMPLE V

*Free radical polymerization of p-(2-hydroxyhexafluoro-2-propyl)styrene*

A. A solution of 20 g. (0.074 g. mole) of freshly prepared p-(2-hydroxyhexafluoro-2-propyl)styrene and 0.2 g. (0.00147 g. mole) of α,α'-azodiisobutyronitrile in 50 ml. of benzene was heated at reflux for 5 hours. The mixture was cooled, and 200 ml. of pentane was added. The solid that formed was broken up, collected on a filter, and dried in a vacuum; yield, 18 g. The polymer was a white powder that softened at 150° C. and was soluble in acetone, benzene and dilute (5%) aqueous sodium hydroxide; $\eta_{inh}=0.08$, at 1% in acetone at 25° C.

A soluble polymer prepared in the above manner was deposited on paper and on nylon fabric from a solution in toluene. The coated paper and fabric showed improved water and oil repellancies in comparison with uncoated controls.

B. A mixture of 5.0 g. (0.0185 g. mole) of freshly redistilled p-2-hydroxylhexafluoro-2-propyl)styrene and 0.05 g. (0.00023 g. mole) of 1,1'-azobis(cyclopropylpropionitrile) was placed under nitrogen in a closed glass vessel and allowed to stand at room temperature. After 30 minutes the mixture was a viscous syrup, at 70 minutes it was a soft gel, and at 95 minutes it was a hard, slightly yellow solid. The solid was shaken with 100 ml. of acetone for 2.5 days, at which time part was dissolved and the remainder was highly swollen. Homogenization of the swollen acetone mixture in a high-speed, high-shear mixer produced a fluid mixture containing only a small amount of undissolved material. The homogenized mixture was filtered and the filtrate was diluted with an excess of distilled water, whereby a gummy coagulate was obtained which changed into a mass of stiff, coherent particles on prolonged stirring. The particles were isolated by filtration and dried in a vacuum oven at 50° C. for 90 minutes. The resultant slightly yellow product was readily broken up and reduced to a powder by grinding. It was soluble in acetone, with inherent viscosity (0.1% conc., 25° C.) of 2.02. Films of 5-6 mils thickness, molded at 165° C. and 500 pounds pressure, were clear, stiff and self-supporting.

Polymers prepared in the above manner were codissolved with polyhexamethylene adipamide (6,6-nylon) in perfluoroacetone hydrate, and films cast from the resultant solutions were clear and homogeneous.

EXAMPLE VI

*Copolymerization of p-(2-hydroxyhexafluoro-2-propyl) styrene and acrylonitrile*

Copolymers of p-(2-hydroxyhexafluoro-2-propyl) styrene and acrylonitrile were prepared in bulk, i.e., in the absence of a solvent or diluent, by holding the monomers at 63° C. for 64 hours with 0.1-0.2% α,α'-azobis(α,γ-dimethylvaleronitrile) as the initiator. The products were hard resins which were essentially insoluble in all the usual solvents, but were highly swollen in dimethylformamide, dimethyl sulfoxide and dilute aqueous sodium hydroxide. The resins were progressively more amber in color with increasing percentage of acrylonitrile in the monomer mixtures. They were pulverized and then purified by swelling in dimethylformamide, deswelling in boiling methanol, filtering and drying. The yields of purified polymers were nearly quantitative, hence the composition of each polymer was essentially the same as that of the corresponding starting monomer mixture. Films, pressed at somewhat above the determined polymer melt temperatures, were clear and self-supporting. Pertinent data for copolymers of various compositions are presented in the following tabulation:

| No. | Monomer Ratio, Wt. Percent HS/AN | Yield, Percent | PMT, °C. | Fluorine, Percent |
|---|---|---|---|---|
| 1 | 63/37 | 97 | 148 | 24.1 |
| 2 | 46/54 | 98 | 225 | 15.4 |
| 3 | 30/70 | 92 | 246 | 12.1 |
| 4 | 16/84 | 88 | 400 | 6.8 |

HS=p-(2-hydroxyhexafluoro-2-propyl)styrene.
AN=Acrylonitrile.
PMT=Polymer melt temperature (i.e., the temperature at which a liquid smear first appears on a hot bar).

EXAMPLE VII

*p-(2-hydroxy-1,3-dichloro-1,1,3,3-tetrafluoro-2-propyl) styrene*

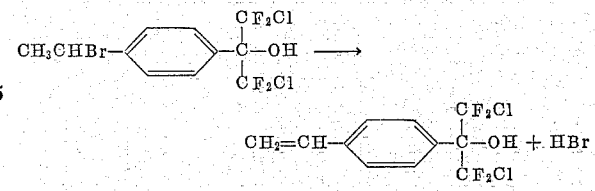

A. α,α-bis(chlorodifluoromethyl)-4-(α'-bromoethyl) benzyl alcohol was prepared in two steps as follows:

(1) A mixture of 80 g. (0.75 g. mole) of ethylbenzene, 100 g. (0.5 g. mole) of s-dichlorotetrafluoroacetone, and 5 g. of aluminum chloride was heated at 100° for 3 hours and 150° for 8 hours in a 240-ml. pressure vessel. The liquid product was distilled to give 17.8 g. of α,α-bis(chlorodifluoromethyl)-4-ethylbenzyl alcohol as a colorless oil, B.P. 65-6° (0.3 mm.), $n_D^{25}$ 1.4773. The infrared and proton n-m-r spectra were consistent with a para-substituted product.

Anal. for $C_{11}H_{10}Cl_2F_4O$:

| | C | H | Cl | F |
|---|---|---|---|---|
| Calc'd | 43.30 | 3.31 | 23.24 | 24.92 |
| Found | 44.00 | 3.23 | 23.19 | 24.71 |

(2) A solution of 6.1 g. (0.038 g. mole) of bromine in 10 ml. of carbon tetrachloride was added dropwise to a stirred solution of 11.63 g. (0.038 g. mole) of α,α-bis-(chlorodifluoromethyl)-4-ethylbenzyl alcohol in 25 ml. of carbon tetrachloride, the mixture being irradiated with a sunlamp. The addition of bromine was accomplished in about 10 minutes. Distillation of the mixture under reduced pressure gave 12.7 g. of α,α-bis(chlorodifluoromethyl)-4-(α'-bromoethyl)benzyl alcohol as a colorless liquid, B.P. 99-100° (0.2 mm.), $n_D^{25}$ 1.5157. The proton n-m-r spectrum was consistent with that expected of a compound containing the group $CH_3CHBr$—.

Anal. for $C_{11}H_9BrCl_2F_4O$:

| | C | H | Br | Cl | F |
|---|---|---|---|---|---|
| Calc'd | 34.40 | 2.36 | 20.81 | 18.47 | 19.79 |
| Found | 35.28 | 2.33 | 20.60 | 18.07 | 19.67 |

B. Ten grams of α,α-bis(chlorodifluoromethyl)-4-(A'-bromomethyl)benzyl alcohol was heated to reflux at 10 mm. pressure for 2 hours, and the resultant mixture was distilled. The fraction that boiled between 120–150° (10 mm.) was redistilled to give 5.7 g. of p-(2-hydroxy-1,3-dichloro-1,1,3,3-tetrafluoro-2-propyl)styrene as a colorless oil, B.P. 78–9° (0.3 mm.), $n_D^{25}$ 1.5044. The $F^{19}$ and proton n-m-r and the infrared spectra were consistent with the above structure.

Anal. for $C_{11}H_8Cl_2F_4O$:

|  | C | H | Cl | F |
|---|---|---|---|---|
| Calc'd | 43.59 | 2.66 | 23.40 | 25.08 |
| Found | 42.79 | 2.73 | 23.50 | 25.12 |

EXAMPLE VIII

*Free radical polymerization of p-(2-hydroxy-1,3-dichloro-1,1,3,3-tetrafluoro-2-propyl)styrene*

A mixture of 3.0 g. (0.01 g. mole) of p-(2-hydroxy-1,3-dichloro-1,1,3,3-tetrafluoro-2-propyl)styrene and 0.03 g. of 1,1'-azobis(cyclopropylpropionitrile) was placed under nitrogen in a stoppered flask and allowed to stand at room temperature for 24 hours. A hard, clear polymer was formed. The polymer was soluble in acetone; $\eta_{inh}=0.97$, at 0.1% in acetone at 25° C.

Anal. for $C_{11}H_8Cl_2F_4O$:

|  | Cl |
|---|---|
| Calc'd | 23.40 |
| Found | 23.31 |

A variety of hydroxydi(polyfluoroalkyl)methyl-substituted styrenes and their polymers can be obtained by methods shown in the foregoing examples. In the following table are listed $R^1$, $R^2$, joined $R^1$–$R^2$, and X groups (cf. Formulas I and II) arranged so that each horizontal line illustrates a representative styrene and an ethylbenzene intermediate from which it can be prepared.

TABLE I

| $R^1$ | $R^2$ | $R^1$–$R^2$ | X |
|---|---|---|---|
| $CF_3$ | $C_3F_7$ | ------ | n-Hexanoyloxy |
| $C_2F_5$ | $C_2F_5$ | ------ | n-Butyryloxy |
| $C_2F_5$ | $C_7F_{15}$ | ------ | Cl |
| $C_7F_{15}$ | $C_7F_{15}$ | ------ | H |
| $CF_3$ | $HCF_2$ | ------ | Benzoxy |
| $H(CF_2)_4$ | $H(CF_2)_4$ | ------ | Acetoxy |
| $H(CF_2)_6$ | $H(CF_2)_6$ | ------ | Acetoxy |
| $ClCF_2$ | $ClCF_2$ | ------ | Br |
| $Cl(CF_2)_8$ | $Cl(CF_2)_8$ | ------ | H |
| ------ | ------ | $C_3F_6$ | Cl |
| ------ | ------ | $C_4F_8$ | Acetoxy |
| ------ | ------ | $C_5F_{10}$ | H |

The polymers obtainable by conventional vinyl polymerization methods, e.g., by means of azo or peroxide free radical initiators, from the hydroxydi(polyfluoroalkyl)methylstyrenes of this invention include copolymers of two or more such styrenes as well as copolymers with one or more other polymerizable ethylenic compounds, e.g., styrene itself, ethylene, methyl acrylate, methyl methacrylate, acrylonitrile, butadiene, chloroprene, vinyl chloride, vinyl fluoride, vinylidene fluoride, chlorotrifluoroethylene, tetrafluoroethylene and hexafluoropropylene.

The monomeric styrenes and the polymers of this invention are characterized by the hydroxydi(polyfluoroalkyl)methyl substituent on the benzene ring. The hydroxydi(polyfluoroalkyl)methyl grouping, though resistant to thermal decomposition or oxidation and unreactive with acidic reagents, readily forms salts with basic reagents.

The hydroxydi(polyfluoroalkyl)methyl-substituted styrene polymers of this invention have unusual solvent holding properties which are illustrated in the following table.

TABLE II.—SOLVENT SWELLING OF p-(2-HYDROXYHEXAFLUORO-2-PROPYL)STYRENE POLYMER

| Solvent | Initial Wgt., Mg. | Swelled Wgt.[1], mg. | Swelled Wt./Initial Wt. | Recovered Weight,[2] mg. | Recovered/Initial Wt. |
|---|---|---|---|---|---|
| Dioxane | 171 | 1,890 | 11.0 | 180 | 1.05 |
| Benzene | 187 | 280 | 1.5 | 180 | 0.96 |
| Pentane | 138 | 150 | 1.1 | 130 | 0.94 |
| Xylene | 196 | 390 | 2.0 | 200 | 1.02 |
| Acetonitrile | 134 | 1,430 | 10.7 | 120 | 0.89 |
| Acetone | 208 | 2,390 | 11.5 | 210 | 1.01 |
| Dimethylformamide | 148 | 1,840 | 12.4 | 150 | 1.01 |
| Methanol | 231 | 2,670 | 11.6 | 220 | 0.95 |
| Ethyl Acetate | 137 | 2,050 | 15.0 | 140 | 1.02 |
| Ether | 192 | 1,500 | 7.9 | 190 | 0.99 |
| Chloroform | 256 | 440 | 1.6 | 240 | 0.94 |
| 1-Pentanethiol | 153 | 1,600 | 10.0 | 250 | 1.58 |
| Triethylamine | 213 | 1,540 | 7.2 | 220 | 1.03 |
| Pyridine | 205 | 2,350 | 11.4 | 230 | 1.12 |

[1] Weight of polymer sample after immersion in solvent for 18 hours.
[2] Weight of polymer sample after swelling with solvent and evacuation in a desiccator at 1 mm. pressure for 18 hours.

By virtue of the solvent-holding properties illustrated in Table II, polymers of this invention are useful as adsorbents for separation of solvents from solvent-containing gaseous or liquid mixtures and as selective adsorbents for removal of minor contaminants in liquid mixtures, e.g., removal of thermally unstable material from fuel oil. Treatment of solvent-swollen polymers by evacuation or with aqueous alkali provide a useful method of releasing absorbed solvents. Soluble and moldable polymers are useful in the form of cast or pressed self-supporting films, and as water- and oil-repellant coatings on paper or fabrics. The soluble polymers, being compatible with polyamides such as nylon, are also useful as clarifying agents in solvent-cast polyamide films, which otherwise are generally cloudy and semi-translucent.

Since obvious modifications and equivalents in the invention will be evident to those skilled in the chemical arts, I propose to be bound solely by the appended claims.

The embodiments of the invention in which an exclusive property or privilege is claimed are defined as follows:

1. A fluorinated styrene of the formula

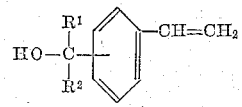

wherein $R^1$ and $R^2$ are selected from the group consisting of two members of the group consisting of monovalent perfluoroalkyl, ω-hydroperfluoroalkyl and ω-chloroperfluoroalkyl of up to 8 carbons and, one divalent perfluoroalkylene of up to 5 carbons.

2. p-(2-hydroxyhexafluoro-2-propyl)styrene.

3. p-(2-hydroxy-1,3-dichloro-1,1,3,3-tetrafluoro-2-propyl)styrene.

4. A polymer of a styrene of claim 1.

5. A homopolymer of a styrene of claim 1.

6. A copolymer of a styrene of claim 1 with at least one other polymerizable ethylenic compound.

7. A polymer of p-(2-hydroxyhexafluoro-2-propyl)styrene.

8. Poly[p-(2-hydroxyhexafluoro-2-propyl)styrene].

9. A copolymer of p-(2-hydroxyhexafluoro-2-propyl)styrene and acrylonitrile.

10. A polymer of p-(2-hydroxy-1,3-dichloro-1,1,3,3-tetrafluoro-2-propyl)styrene.

11. Poly[p-(2-hydroxyhexafluoro-2-propyl)styrene].

12. A polymer of claim 4 swollen with an organic solvent.

13. Poly[p-(2-hydrohexafluoro-2-propyl)styrene] swollen with an organic solvent.

14. The process of preparing a fluorinated styrene which comprises pyrolyzing at a temperature of up to about 800° C. a compound of the formula

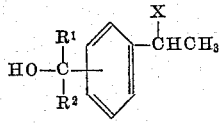

wherein $R^1$ and $R^2$ are selected from the group consisting of two members of the group consisting of monovalent perfluoroalkyl, ω-hydroperfluoroalkyl and ω-chloroperfluoroalkyl of up to 8 carbons and, one divalent perfluoroalkylene of up to 5 carbons and X is selected from the group consisting of hydrogen, chlorine, bromine and

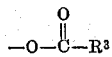

$R_3$ being alkyl of up to 18 carbons.

15. The process of preparing p-(2-hydroxyhexafluoro-2-propyl)styrene which comprises pyrolyzing α,α-bis(trifluoromethyl)-4-(α'-acetoxyethyl)benzyl alcohol at a temperature of up to about 800° C.

16. The process of preparing p-(2-hydroxyhexafluoro-2-propyl)styrene which comprises dehydrogenating α,α-bis(trifluoromethyl)-4-ethylbenzyl alcohol at a temperature of up to about 800° C.

17. The process of claim 16 employing an oxide catalyst.

18. The process of preparing p-(2-hydroxyhexafluoro-2-propyl)styrene which comprises pyrolyzing α,α-bis(trifluoromethyl)-4-(α'-bromoethyl)benzyl alcohol at a temperature of up to about 800° C.

19. The process of preparing p-(2-hydroxy-1,3-dichloro-1,1,3,3-tetrafluoro-2-propyl)styrene which comprises pyrolyzing α,α - bis(chlorodifluoromethyl)-4-(α'-bromoethyl)benzyl alcohol at a temperature of up to about 800° C.

20. A self-supporting film formed from a polymer of claim 4.

21. A self-supporting film formed from poly[p-(2-hydroxyhexafluoro-2-propyl)styrene].

22. A self-supporting film formed from a copolymer of p-(2-hydroxyhexafluoro-2-propyl)styrene and acrylonitrile.

References Cited by the Examiner
UNITED STATES PATENTS 2,580,504  1/52  Bachman et al. _____ 260—618
3,057,932  10/62  Hiser _____ 260—618

OTHER REFERENCES

Bachman et al.: JACS, vol. 69 (1947), page 2022–2025.

Tarrant et al.: J. Org. Chem., vol. 24 (1959), pages 283–9.

JOSEPH L. SCHOFER, *Primary Examiner.*

DONALD E. CZAJA, LEON J. BERCOVITZ,
*Examiners.*

UNITED STATES PATENT OFFICE
CERTIFICATE OF CORRECTION

Patent No. 3,179,640　　　　　　　　　　　　　April 20, 1965

William J. Middleton

It is hereby certified that error appears in the above numbered patent requiring correction and that the said Letters Patent should read as corrected below.

Column 4, line 42, for "By" read -- B. --; column 5, line 40, for "p-2-hydroxylhexafluoro-2-propyl)styrene" read -- p-(2-hydroxyhexafluoro-2-propyl)styrene --; column 8, line 70, for "Poly[p-(2-hydroxyhexafluoro-2-propyl)styrene]" read -- Poly[p-(2-hydroxy-1,3-dichloro-1,1,3,3-tetrafluoro-2-propyl)styrene] --.

Signed and sealed this 14th day of September 1965.

(SEAL)
Attest:

ERNEST W. SWIDER　　　　　　　　　　　　　EDWARD J. BRENNER
Attesting Officer　　　　　　　　　　　　　Commissioner of Patents